United States Patent [19]

Seto et al.

[11] Patent Number: 4,736,245
[45] Date of Patent: Apr. 5, 1988

[54] CALIBRATION METHOD FOR COLOR FILM INSPECTION SYSTEM

[75] Inventors: Yasuhiro Seto; Kazuo Shiota, both of Kanagawa, Japan

[73] Assignee: Fuji Photo Film Co., Ltd., Kanagawa, Japan

[21] Appl. No.: 63,223

[22] Filed: Jun. 18, 1987

Related U.S. Application Data

[63] Continuation-in-part of Ser. No. 805,607, Dec. 6, 1985, abandoned.

[30] Foreign Application Priority Data

Dec. 12, 1984 [JP] Japan .................. 59-261974
Dec. 12, 1984 [JP] Japan .................. 59-261975

[51] Int. Cl.$^4$ ............................................. H04N 1/46
[52] U.S. Cl. ........................................... 358/76; 358/80
[58] Field of Search ..................... 358/76, 78, 75, 80

[56] References Cited

U.S. PATENT DOCUMENTS

| 4,310,848 | 1/1982 | Carter | 358/76 |
| 4,396,940 | 8/1983 | Tanaka | 358/80 |
| 4,402,015 | 8/1983 | Yamada | 358/80 |
| 4,467,364 | 8/1984 | Konagaya | 358/76 |
| 4,534,059 | 8/1985 | Yamada | 358/80 |

Primary Examiner—Howard W. Britton
Attorney, Agent, or Firm—Wenderoth, Lind & Ponack

[57] ABSTRACT

The conventional color film inspection system does not consider calibration of an image input unit at all. It therefore cannot maintain precision at a sufficiently high level against shifts caused by gains or offset fluctuation. This invention system can prevent deterioration in inspection precision against gain drift or offset drift as it is adapted to calibrate the input unit. Further, as this invention system can obtain in advance the correspondence between images displayed in the color film inspection system with images actually printed, the original images on a negative film, if once inspected optimally, can always be printed optimally.

6 Claims, 10 Drawing Sheets

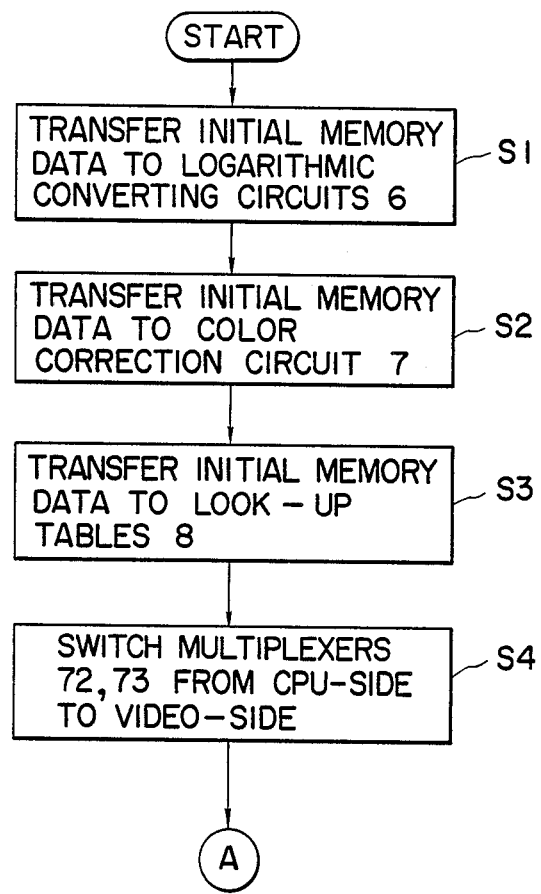
F I G. 7A

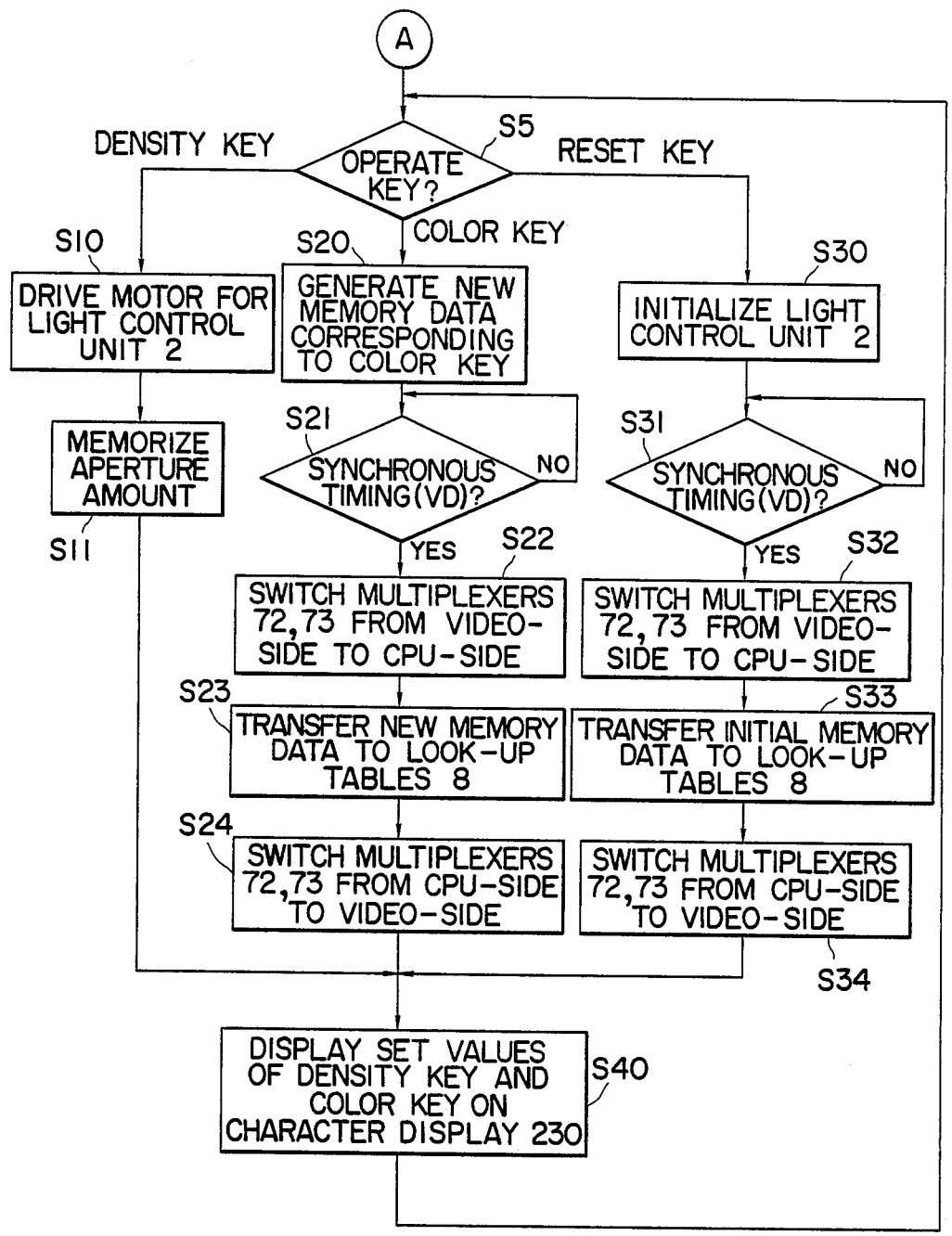
F I G. 7B

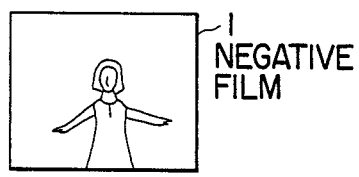
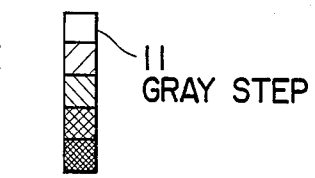
FIG. 10A    FIG. 10B
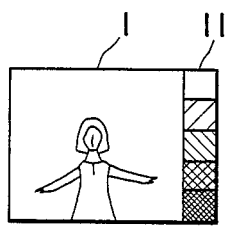
FIG. 11
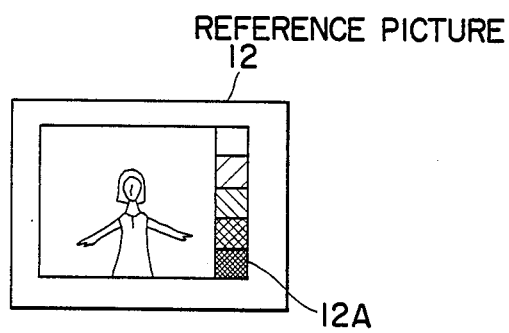
FIG. 12

CALIBRATION METHOD FOR COLOR FILM INSPECTION SYSTEM

CROSS-REFERENCE TO RELATED APPLICATION

This application is a continuation in part of our prior application Ser. No. 805,607, filed on Dec. 6, 1985, entitled CALIBRATION METHOD FOR COLOR FILM INSPECTION SYSTEM, and now abandoned.

BACKGROUND OF THE INVENTION

This invention relates to a calibration method for an input section of a color film inspection system which evaluates color original images of a negative film before photographic printing process.

There has been known in the prior art as the color film inspection system of this type the one disclosed in Japanese Patent Laid-open No. 207238/1982 wherein the color images which have been automatically corrected in color and density are displayed on a color monitor. An operator observes the monitored images to evaluate the automatically corrected color images and discriminates the images which are not desirable in density or color-balance or which should not be printed as they are out of focus. Only for those which are difficult to be automatically corrected (color failure, rear light, light sources of different types, etc.), the operator has to manually correct the density and color by a manual operation of a data input section. This system allows even unskilled and inexperienced operators to produce photographs of high quality without necessitating a highly precise color film automatic analyzer. The correction information which is determined by the operator or automatically computed by the system is recorded on a recording medium such as a paper tape or a magnetic tape, and when a color film is mounted on an automatic printer at photographic printing process, the recording medium is read out to control the printing exposure amount with the correction information.

In such a conventional inspection system, however, calibration of the image input section is not taken into account at all thereby presenting difficulties in maintaining precision in inspection against fluctuation in gain or offset.

The inspection by the conventional systems is conducted in the procedure as shown in FIG. 1. A film with original images to be printed, for instances a negative film 100 is illuminated with light from a light source 101 and the whole images are picked up by an image pick up device such as a TV camera 102 and inputted into an image processing circuit 110. The image processing circuit 110 includes a color correction circuit, a gradation conversion table and a negative/positive converter, so that it conducts necessary processing on the video signals from the TV camera 102 to display images of the negative film 100 on a display unit 115 such as a CRT via a display control circuit 113. An operator watches the images displayed on the display unit 115 and if the operator judges the color balance or the density unsatisfactory, corrects the images by manipulating a keyboard 114. The analyzed data of the image processing is recorded on a recording medium 112 such as a magnetic tape, a floppy disc or a paper by a data output device 111. The negative film 100 which has been inspected and corrected in this way is sent to a photographic color printer 120 together with the data recorded on the recording medium 112 by the data output device 111 and the photographic color printer 120 prints the images on a color paper to provide a photograph 121.

In the above described conventional system, the negative film 100 on the display unit 115 is inspected by the operator, but the images on the resultant photograph 121 is printed by the photographic color printer 120 on the color paper. Unless the images displayed on the display unit 115 in the inspection system is accurately corresponded to the photograph 121 printed by the color printer 120, the photograph 121 printed by the color printer 120 is not necessarily optimal even if the images are correctly displayed and corrected optimally at the display unit 115. This presents a difficulty.

SUMMARY OF THE INVENTION

This invention was conceived under the above mentioned circumstances and aims at providing an effective and accurate calibration method for an input section of the color film inspection system.

Another object of this invention is to provide a film inspection method of obtaining in advance the correspondence between the images displayed on the inspection system and the images actually printed to ensure that film original images which have been optimally corrected be always printed at optimal color balance and density.

According to one aspect of this invention, for achieving the objects described above, there is provided a calibration method for an input section of a color film inspection system comprising an image pick-up device which picks up original color images to be inspected, A/D converters which convert video signals from the image pick-up device into digital values, conversion tables which convert output digital values from the A/D converter into density signals with logarithmic tables, a color correction circuit which corrects in color outputs signals from the conversion tables, gradation converting means which convert in gradation three primary color signals from the color correction circuit independently and separately, and a color monitor which converts the output from the gradation converting means into analog values and displays the same, which is characterized in that offset correction is conducted by shifting said conversion table in a horizontal direction on an input axis side, and gain correction is conducted by shifting said conversion tables in a vertical direction on an output axis side.

According to another aspect of this invention, there is provided a film inspection method which displays film original images to be printed on a display unit of a film inspection system, which is characterized in that a gray step comprising gradation predetermined density differences and having masking density identical to that of said film original images is printed together with a film with original images in optimal manner to obtain a reference picture, said gray step is mounted in said film inspection system and displayed on said display unit, a gradation conversion table is prepared from the displayed gray step and gray step data of said reference picture, and the data table is set as a gradation table for said film inspection system.

The nature, principle and utility of the invention will become more apparent from the following detailed description when read in cojunction with the accompanying drawings.

BRIEF DESCRIPTION OF THE DRAWINGS

In the accompanying drawings:

FIGS. 7A and 7B are flow charts showing an operation of a CPU in FIGS. 2 and 3;

FIGS. 10A and 10B, FIG. 11 and FIG. 12 are explanatory views of this invention method, respectively;

DESCRIPTION OF THE PREFERRED EMBODIMENTS

Figure 1:
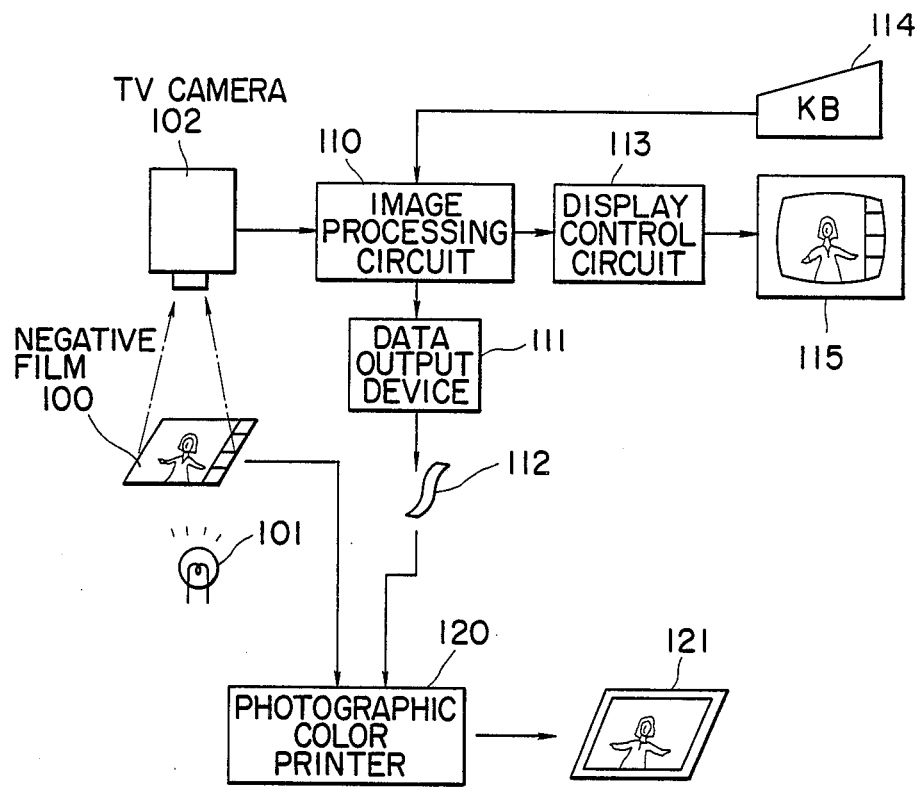
FIG. 1 is an explanatory view of a film inspection procedure in a conventional color film inspection system.
Figure 2:
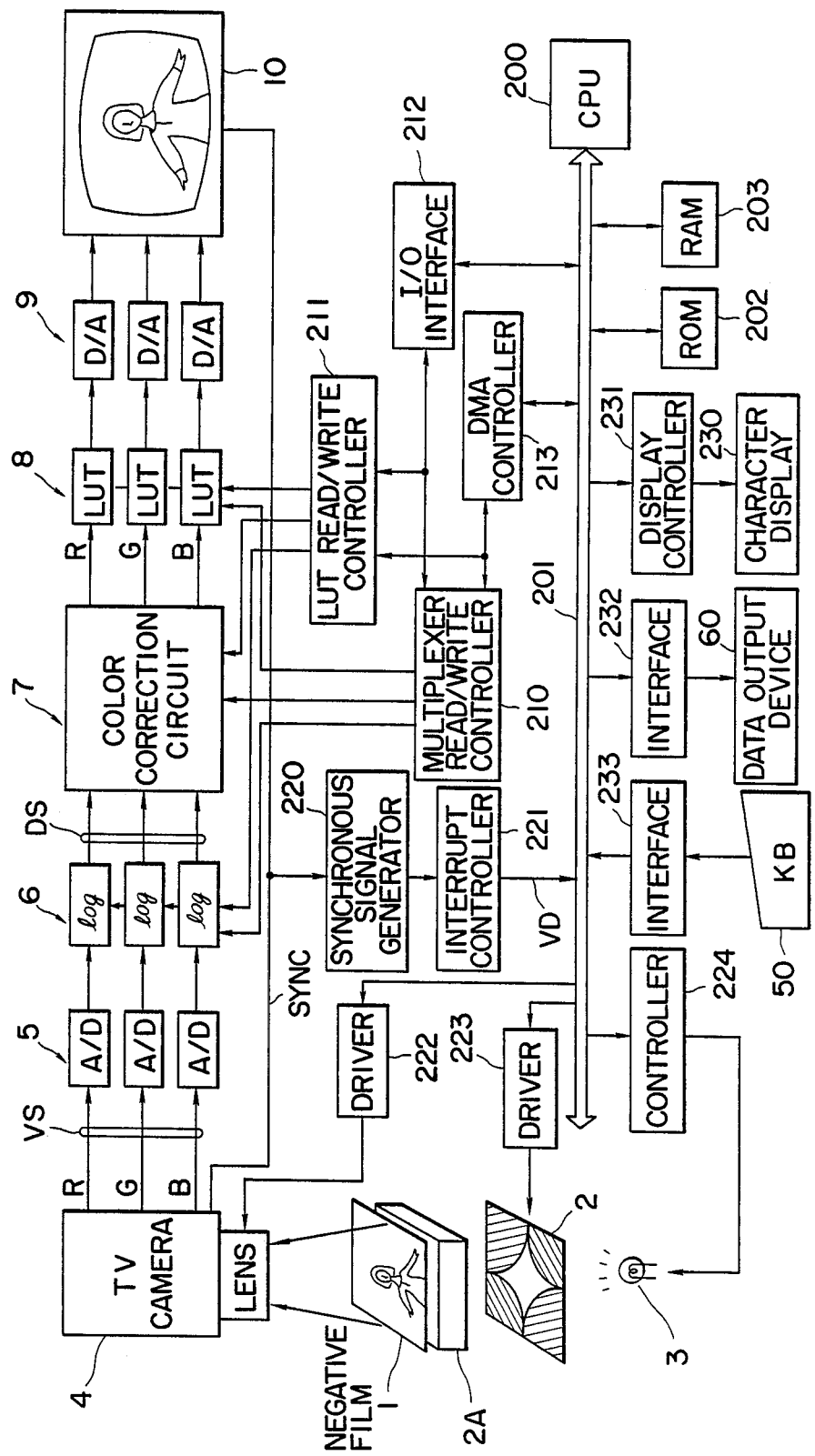
FIG. 2 is a block diagram to show an embodiment of a color film inspection system of this invention.
Figure 3:
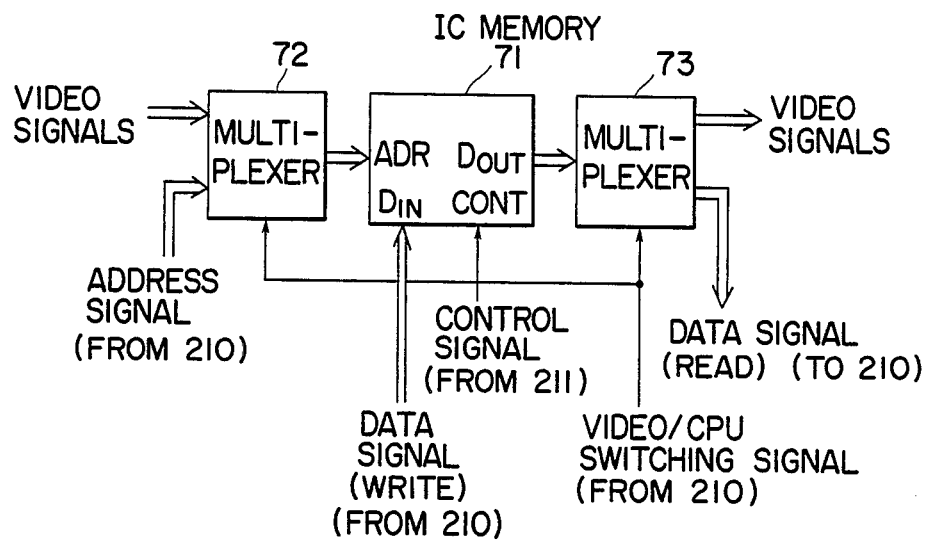
FIG. 3 is a detail block diagram showing a color correction circuit, logarithmic converting circuits and look-up tables in FIG. 2.
Figure 4:
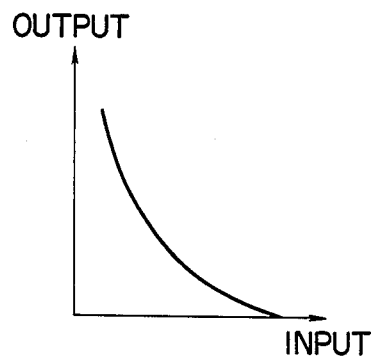
FIG. 4 is a graph to show an example of output characteristic logarithmic conversion.

FIG. 2 shows the color film inspection system to which this invention is to be applied wherein a negative film 1 as a color original image is illuminated with light from a light source 3 via a light control unit 2 and a mirror box 2A, and picked up as a whole by a TV camera 4 as an image pick-up device. The video signals VS of three primary colors RGB from the TV camera 4 are inputted respectively to A/D (analog-to-digital) converters 5 to be converted to digital values, inputted to logarithmic converting circuits 6 in the form of look-up tables to be converted into logarithm with functions as shown in FIG. 4 and converted into density signals DS. The density signals DS thus obtained by the logarithmic converting circuits 6 are respectively inputted to a color correction circuit 7 for color correction in accordance with a predetermined expression or, if necessary, negative/positive conversion, inputted to look-up tables 8 for gradation conversion, converted into analog values at D/A (digital-to-analog) converters 9 and inputted to a color monitor 10 such as a CRT to display the images of the negative film 1. All of the color correction circuit 7 comprise, the logarithmic converting circuits 6 and the look-up tables 8 of an IC memory 71 and two multiplexers 72 and 73 as shown in FIG. 3, respectively. In other words, the logarithmic converting circuits 6, the color correction circuit 7 and the look-up tables 8 have the same construction. The multiplexers 72 and 73 are operatively switched by a video/CPU switching signal transmitted from a multiplexer read/write controller 210. If the multiplexers 72 and 73 are respectively switched from CPU-side to video-side, the multiplexer 72 inputs video signals transmitted from a former stage and the multiplexer 73 outputs the video signals, and if the multiplexers 72 and 73 are respectively switched from the video-side to the CPU-side, the multiplexer 72 inputs an address signal transmitted from the CPU 200 and the multiplexer 73 outputs data signal read in the IC memory 71.

The CPU 200 controls the whole system and has a CPU bus-line 201 which is operatively connected to a ROM (Read Only Memory) 202 and a RAM Random Access Memory) 203. The logarithmic converting circuits 6, the color correction circuits 7 and the look-up tables 8 are controlled by the look-up, table read/write controller 211 and the multiplexer read/write controller 210 as described above, and the multiplexer read/write controller 210 and the look-up read/write controller 211 are operatively connected to the CPU 200 via DMA (Direct Memory Access) controller 213 and an input/output interface 212. The TV camera 4 and the color monitor 10 are synchronous with a horizontal synchronous signals SYNC each other, the horizontal synchronous signal SYNC is inputted to a synchronous signal generator 220 and a vertical synchronous signal VD thus obtained is inputted to the CPU 200 via an interrupt controller 221. Further, the CPU 200 is connected to a keyboard 50 which is manipulated by an operator via an interface 233, is connected to a data output device 60 for recording the inspection result of the negative film 1 on a magnetic tape or a floppy disc via an interface 232, and further is connected to a character display 230 through a display controller 231. The CPU 200 controls a magnification of the TV camera 4 via a driver 222, an aperture of the light control unit 2 via a driver 223 and light amount of the light source 3 via controller 224.

Figure 5A:
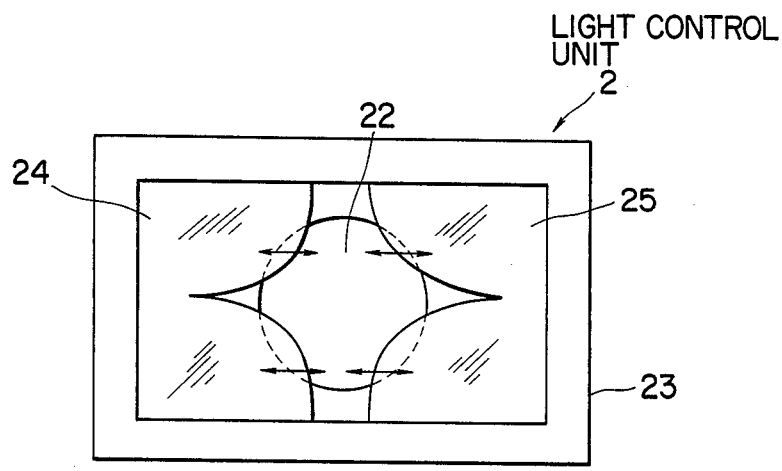
FIG. 5A is a plane view to show an embodiment of a light control unit.
Figure 5B:
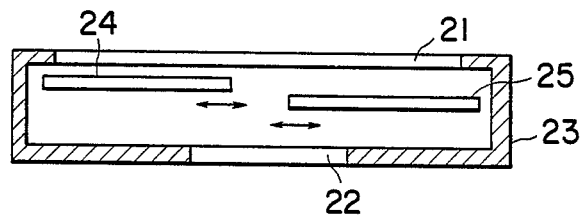
FIG. 5B is a cross sectional side view thereof.
Figure 6:
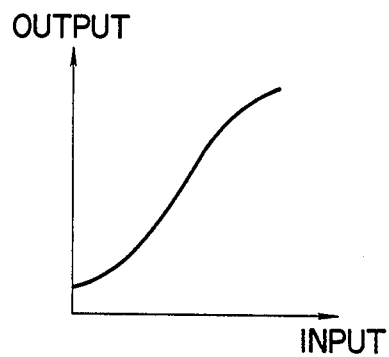
FIG. 6 is a graph to show an example of gradation conversion table characteristic.

As shown in FIGS. 5A and 5B, the light control unit 2 comprises a box-like frame 23 which includes an upper rectangular aperture 21 and a bottom circular light path hole 22. A pair of light blocking plates 24 and 25 are arranged within the frame 23 in a manner to encircle the light path hole 22 but in stagger from each other to be moved interlockingly by the driver 223 in the direction shown with arrows. The degree of opening of the light control unit 2 is operatively adjusted with the movement of the light blocking plates 24 and 25 to form a light path. The look-up tables 8 include respective conversion tables of gradation for RGB colors and FIG. 6 shows an example of data table set therein.

In the system with the above described construction, the operation will now be described in more detail with reference to from charts in FIGS. 7A and 7B.

When power of the system is turned on, predetermined first initial memory data is transferred to the logarithmic converting circuits 6 via the look-up table read/write controller 211 and the multiplexer read/write controller 210 and then set therein (Step S1), predetermined second initial memory data transferred to the IC memory 71 in the color correction circuit 7 via the multiplexer read/write controller 210 and the look-up table read/write controller 211 and then set therein (Step S2) and predetermined third initial memory data is transferred to the look-up tables 8 via the look-up table read/write controller 211 and the controller 210 and then set therein (Step S3). The respective multiplexers 72 and 73 are switched to the CPU-side at the above setting operation, therefore the CPU 200 is able to directly access the IC memory 71 via the DMA controller 213 and to transfer the initial memory data in advance stored in the RAM 203 to the logarithmic converting circuit 6, the IC memory 71 and the look-up tables 8. Then, the multiplexers 72 and 73 are respectively switched from the CPU-side to the video-side by the video/CPU switching signal (Step S4) so that images picked-up by the TV camera 4 should be displayed on the color monitor 10.

The negative film 1 is exposed with the predetermined amount of light from the light source 3 which is controlled by controller 224, and the images are picked-up by the TV camera 4 to be converted into digital values by the A/D converters 5. They are color-compensated with the density signals DS which have been converted by the logarithmic converting circuits 6, converted in gradation by the look-up tables 8 and displayed at the color monitor 10 in positive images. The CPU 200 controls the light source 3 via the controller 224 so that it will emit a predetermined amount of light. The luminance of the color monitor 10 is adjusted by controlling the aperture of the color compensation unit 2 via the driver 223. More specifically, the light path may be narrowed by moving the light blocking plates 24 and 25 respectively in the direction toward center of the path by the control of the driver 223 so that the amount of light emitted from the light source 3 onto the negative film 1 is reduced to enhance the luminance of the images displayed on the color monitor 10. Conversely, by moving the light blocking plates 24 and 25 outward respectively to enlarge the aperture, the light path is expanded so that the amount of light illuminating from the light source 3 onto the negative film 1 increases to lower the luminance of the images displayed on the color monitor 10. Since the amount of light transmitted through the negative film 1 via the aperture of the color compensation unit 2 is irrespective of the wave-length of the light, and is varied for three primary colors at the same ratio. This is advantageous in color compensation of each color in the color correction circuit 7 as the variation of the color R would not influence compensation of other colors such as G and B and the displayed images can be controlled as a whole with luminance alone. The image displayed on the color monitor 10 become bright or dark in correspondence to over- or under-exposure of the negative film 1. The operator operates the keyboard 50 (Step S5) so that the images displayed on the color monitor 10 become suitable color and density.

The above arrangement allows the operator to control the color compensation unit 2 by manipulating the keyboard 50 via the CPU 200 and the driver 223 to have the optimalluminace when the judges the luminance of the images displayed on the color monitor 10 insufficient or excessive (Step S10). The change in density entails over- or under-exposure of the negative film 1 may be dealt with simply by controlling a light source means without deteriorating the S/N ratio. The aperture amount of the light control units corresponding to the moving amount by the driver 223 is memorized in the RAM via the CPU 200 (Step S11).

If the color balance of the images displayed on the color monitor 10 is not satisfactory, the operator manipulates a color key on the keyboard 50 (Step S5) thereby to generate new memory data in the RAM via the CPU 200 corresponding to the value of the manipulated color key (Step S20). Then, the CPU 200 inputs a vertical synchronous signal VD at a synchronous timing via the synchronous signal generator 220 and the interrupt controller 221 (Step S21) and switches the multiplexers 72 and 73 from the video-side to the CPU-side via the multiplexer read/write controller 210 and the controller 211 (Step S22). Next, the CPU 200 transfers the data set in the RAM 203 at the above step S20 to the look-up tables 8, up-dates the table data (Step S23) and then switches the multiplexers 72 and 73 from the CPU-side to the video-side (Step S24).

Figure 8:
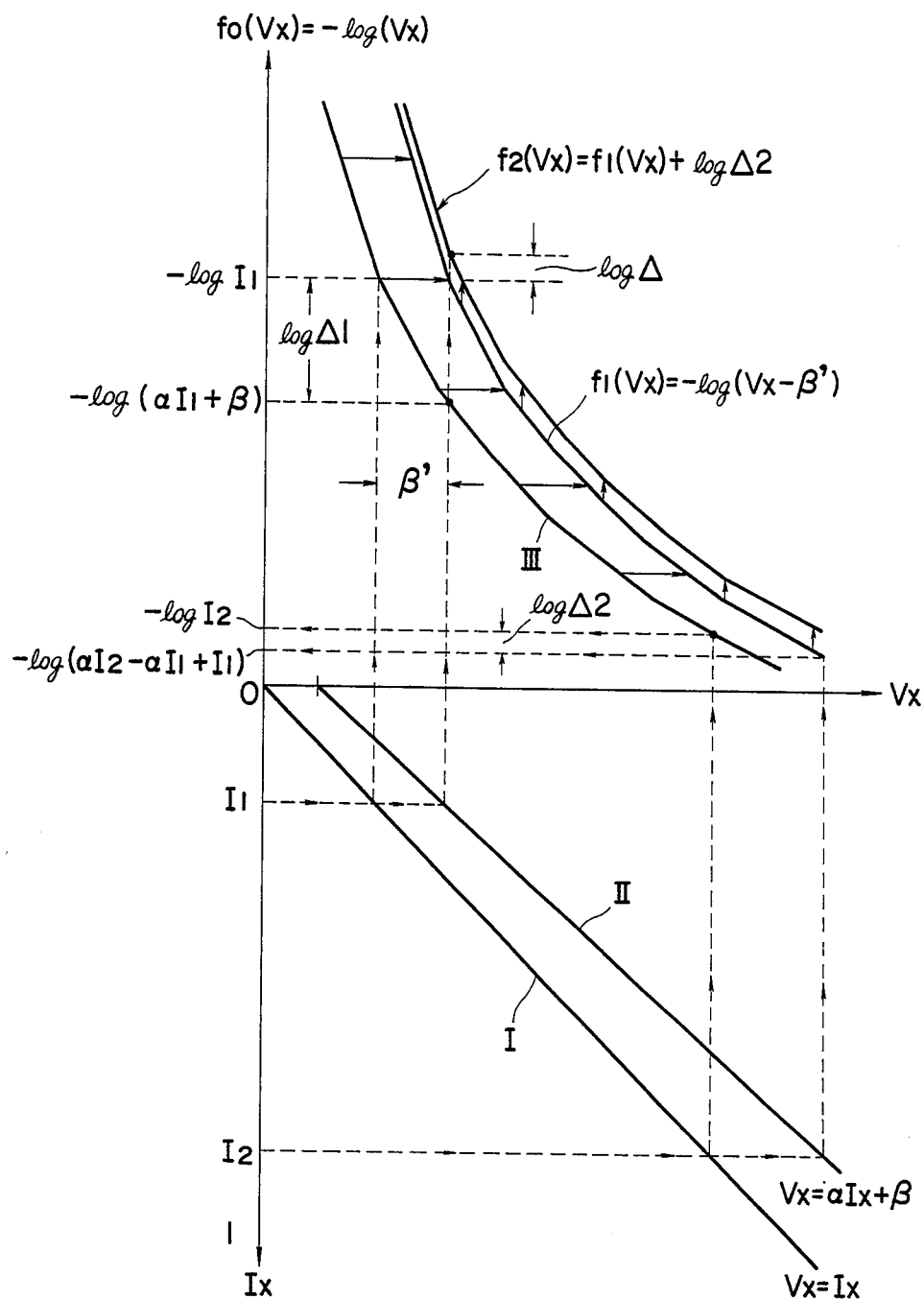
FIG. 8 is a graph to explain this invention method.

According to this invention, at the logarithmic converting circuits 6 having the characteristic shown in FIG. 4, calibration is conducted against gain drift or offset drift by shifting the conversion table both in horizontal and vertical directions. FIG. 8 shows the operation of calibration which will be described below.

FIG. 8 shows a conversion table for one color wherein the horizontal axis Vx represents an output from the TV camera 4 or the input at the logarithmic converting circuits 6 while the vertical axis Ix represents amount of input light at the TV camera 4. $F_0(Vx)$ denotes the output from the logarithmic converting circuits 6. The function I (Vx=Ix) represents a reference function which is "0" in offest and "1" in gain. The reference conversion table which corresponds to the reference function I is denoted by curve III. The function becomes curve II ($Vx = \alpha Ix + \beta$) if the reference function I has offset drift $\beta$ and gain drift $\alpha$. The calibration would be completed if a conversion table corresponding to the above function II is obtained. As shown in the figure, the correction can be expressed by the equation below.

$$f_0(Vx) = -\log Vx \tag{1}$$

If we suppose that offset correction is conducted by feeding the amount of light which satisfies the relation $Ix = I_1$ and the correction function of degree 2n is expressed by the equation $f_{2n}(Vx) = a_{2n}Vx + b_{2n}$, the correction function of degree (2n+1) can be obtained by correcting the correction function of degree of 2n so as to satisfy the relation $f_{2n+1}(V_1) = -\log I_1$. Here, the correction function of degree 2n is $f_{2n}(V_1) = -\log(a_{2n}V_1 + b_{2n})$ and the difference from the objective function is expressed as $$\begin{aligned}\log\Delta &= f_{2n+1}(V_1) - f_{2n}(V_1) \\ &= -\log I_1 - (-\log(a_{2n}V_1 + b_{2n})) \\ &= \log(a_{2n}V_1 + b_{2n})/I_1\end{aligned} \tag{2}$$

If it is assumed that $f_{2n}(Vx)$ has been corrected in gain against Ix, the relation holds as below;

$$\left.\begin{aligned}f_{2n}(V_1) &= -\log(I_1 + \beta') \\ \log\Delta &= \log(I_1 + \beta')/I_1\end{aligned}\right\} \tag{3}$$

then, the relation holds;

$$\left.\begin{aligned}(a_{2n}V_1 + b_{2n})/I_1 &= (I_1 + \beta')/I_1 \\ \beta' &= a_{2n}V_1 + b_{2n} - I_1\end{aligned}\right\} \tag{4}$$

thus, the correction function is obtained as below;

$$\begin{aligned}f_{2n+1}(Vx) &= f_{2n}(Vx - \beta') \\ &= -\log(a_{2n}Vx + b_{2n} - a_{2n}V_1 - b_{2n} + I_1) \\ &= -\log(a_{2n}Vx + I_1 - a_{2n}V_1)\end{aligned} \tag{5}$$

If it is assumed that the gain correction is conducted by feeding the light in an amount which makes $Ix = I_2$ and that the correction function of degree (2n-1) is expressed as $f_{2n-1}(Vx) = -\log(a_{2n-1}Vx + b_{2n-1})$, the correction function of degree 2n can be obtained by correcting the correction function of degree $(2n-1)$ in a manner to make $f_{2n}(V_2)=-\log I_2$ where $I_x=I_2$. The correction function of degree $(2n-1)$ is represented by $f_{2n-1}(V_2)=(a_{2n-1}V+b_{2n-1})$ and the difference from the objective value becomes as below;

$$\log\Delta = f_{2n}(V_2) - f_{2n-1}(V_2) \tag{6}$$

$$= -\log I_2 - \{(-\log(a_{2n-1}V_2 + b_{2n-1})\}$$

$$= \log(a_{2n-1}V_2 + b_{2n-1})/I_2$$

Therefore, the correction function will be expressed as;

$$f_{2n}(Vx) = f_{2n-1}(Vx) + \log\Delta \tag{7}$$

$$= \log(a_{2n-1}Vx + b_{2n-1}) + \log(a_{2n-1}V_2 + b_{2n-1})/I_2$$

$$= -\log\{I_2(a_{2n-1}Vx + b_{2n-1})/(a_{2n-1}V_2 + b_{2n-1})\}$$

If it is assumed that correction function of degree n is expressed as $f_n(Vx)=-\log(a_n Vx+b_n)$, the relations hold as below, $$\left.\begin{array}{l} a_{2n} = I_2 a_{2n-1}/(a_{2n-1}V_2 + b_{2n-1}) \\ a_{2n+1} = a_{2n} \end{array}\right\} \tag{8}$$

the relation holds, $$a_{2n} = I_2 a_{2(n-1)}/(a_{2(n-1)}V_2 + b_{2n-1}) \tag{9}$$

and further, $$b_{2n+1} = I_1 - a_{2n}V_1 \tag{10}$$

$$b_{2n-1} = I_1 - a_{2(n-1)}V_1 \tag{11}$$

$$b_{2n} = b_{2n-1}I_2/(a_{2n-1}V_2 + b_{2n-1}) \tag{12}$$

$$= b_{2n-1}I_2/(a_{2(n-1)}V_2 + b_{2n-1})$$

$$a_{2n} = I_2 a_{2(n-1)}/\{a_{2(n-1)}V_2 + I_1 - a_{2(n-1)}V_1\} \tag{13}$$

$$= I_2 a_{2(n-1)}/\{(V_2 - V_1)a_{2(n-1)} + I_1\}$$

$$= I_2 a_{2(n-1)}/\{V_o a_{2(n-1)} + I_1\}$$

where $V_o = V_2 - V_1$ $$b_{2n} = b_{2n-1}I_2/(a_{2(n-1)}V_2 + b_{2n-1}) \tag{14}$$

$$= I_2\{I_1 - a_{2(n-1)}V_1\}/\{a_{2(n-1)}V_2 + I_1 - a_{2(n-1)}V_1\}$$

$$= \{I_1 I_2 - V_1 I_2 a_{2(n-1)}\}/\{V_o a_{2(n-1)} + I_1\}$$

The coefficients $a_m$ and $b_m$ can be expressed with the functional equations of $a_{m-1}$ and $b_{m-1}$. The general solution of the coefficients $a_m$ and $b_m$ will be;

$$a_{2n} = I_2 a_{2(n-1)}/(V_o a_{2(n-1)} + I_1) \tag{15}$$

$$= \frac{I_2 \dfrac{I_2 a_{2(n-2)}}{V_o a_{2(n-2)} + I_1}}{V_o \dfrac{I_2 a_{2(n-2)}}{V_o a_{2(n-2)} + I_1}} = \frac{I_2^2 a_{2(n-1)}}{V_o I_2 a_{2(n-2)} + I_1(V_o a_{2(n-2)} + I_1)}$$

$$= \frac{I_2^2 a_{2(n-2)}}{V_o I_1(I_1 + I_2)a_{2(n-2)} + I_1^2}$$

$$= \frac{I_2^2 \dfrac{I_2 a_{2(n-3)}}{V_o a_{2(n-3)} + I_1}}{V_o(I_1 + I_2)\dfrac{I_2 a_{2(n-3)}}{V_o a_{2(n-3)} + I_1} + I_2}$$

$$= \frac{I_2^3 a_{2(n-3)}}{V_o(I_1 + I_2)I_2 a_{2(n-3)} + I_1^2(V_o a_{2(n-3)} + I_1)}$$

$$= \frac{I_2^3 a_{2(n-3)}}{V_o(I_1^2 + I_1 I_2 + I_2^2)a_{2(n-3)} + I_1^3}$$

$$= \frac{I_2^3 \dfrac{I_2 a_{2(n-4)}}{V_o a_{2(n-4)} + I_1}}{V_o(I_1^2 + I_1 I_2 + I_2^2)\dfrac{I_2 a_{2(n-4)}}{V_o a_{2(n-4)} + I_1} + I_1}$$

$$= \frac{I_2^4 a_{2(n-4)}}{V_o(I_1^2 + I_1 I_2 + I_2^2)I_2 a_{2(n-4)} + I_1^3(V_o a_{2(n-4)} + I_1)}$$

$$= \frac{I_2^4 a_{2(n-4)}}{V_o(I_1^3 + I_1^2 I_2 + I_1 I_2^2 + I_2^3)a_{2(n-4)} + I_1^4}$$

$$a_{2n} = \frac{I_2^n a_0}{V_o(I_1^{n-1} + I_1^{n-2}\cdot I_2 + \ldots + I_1 I_2^{n-2} + I_2^{n-1})a_0 + I_1^n} \tag{16}$$

$$a_{2n+1} = a_{2n} \tag{17}$$

Under the following conditions;

$$\left.\begin{array}{ll} Vx = \alpha Ix + \beta & a_0 = 1, b_0 = 0 \\ I_1 = pI_0 & 0 < p < q \\ I_2 = qI_0 & 0 < q < 1 \end{array}\right\} \tag{18}$$

the above equations become as below;

$$V_0 = V_2 - V_1 = \alpha q I_0 + \beta - \alpha p I_0 - \beta = \alpha(q-p)I_0 \tag{19}$$

$$a_{2n} = \frac{I_2^n a_0}{V_0(I_1^{n-1} + I_1^{n-2}\cdot I_2 + \ldots + I_1 I_2^{n-2} + I_2^{n-1})a_0 + I_1^n} \tag{20}$$

$$= \frac{q^n I_0^n}{V_0(p^{n-1}I_0^{n-1} + p^{n-2}q I_0^{n-1} + \ldots + p^{n-2}\cdot I_0^{n-1} + q^{n-1}\cdot I_0^{n-1}) + p^n I_0^n}$$

$$= \frac{q^n I_0^n}{V_0 I_0^{n-1}(p^{n-1} + p^{n-2}q + \ldots + pq^{n-2}\cdot q^{n-1}) + p^n I_0^n}$$

$$= \frac{q^n I_0^n}{\alpha(q-p)I_0^n(p^{n-1} + p^{n-2}q + \ldots + pq^{n-2}\cdot q^{n-1}) + p^n I_0^n}$$

$$= \frac{q^n}{\alpha(q-p)(p^{n-1}+p^{n-2}q+\ldots+pq^{n-2}\cdot q^{n-1})+p^n}$$

$$= q^n/\{\alpha(p^{n-1}+p^{n-2}q^2+\ldots+pq^{n-1}+q^n-p^n-{}^{n-1}q-\ldots-p^2q^{n-2}-pq^{n-1})+p^n\}$$
$$= q^n/\{\alpha(q^n-p^n)+p^n\}$$
$$= q^n/\{\alpha q^n+(1-\alpha)p^n\}$$

The one with the coefficient $b_{2n}$ will be obtained similarly under the same conditions as expressed below:

$$b_{2n} = \frac{I_1 I_2 - V_1 I_2 a_{2(n-1)}}{V_0 a_{2(n-1)} + I_1} \quad (21)$$

$$= \frac{I_1 I_2 - V_1 I_2 \dfrac{I_2^{n-1}a_0}{V_0(I_1^{n-2}+I_1^{n-3}\cdot I_2+\ldots+I_1\cdot I_2^{n-3}+I_2^{n-2})a_0+I_1^{n-1}}}{V_0 \dfrac{I_2^{n-1}a_0}{V_0(I_1^{n-2}+I_1^{n-3}\cdot I_2+\ldots+I_1 I_2^{n-3}+I_2^{n-2})a_0+I_1^{n-1}}+I_1}$$

$$= \frac{\{V_0(I_1^{n-2}+I_1^{n-3}\cdot I_2+\ldots+I_1 I_2^{n-3}+I_2^{n-2})a_0+I_1^{n-1}\}I_1 I_2 - V_1 V_2^n a_0}{V_0 I_2^{n-1}a_0+I_1\{V_0(I_1^{n-2}+I_1^{n-3}\cdot I_2+\ldots+I_1 I_2^{n-3}+I_2^{n-2})a_0+I_1^{n-1}\}}$$

$$= \frac{V_0 a_0(I_1^{n-1}\cdot I_2+I_1^{n-2}I_2^2+\ldots+I_1^2 I_2^{n-2}+I_1 I_2^{n-1})+I_1^n I_2 - V_1 I_2^n a_0}{V_0 a_0(I_1^{n-1}+I_1^{n-2}\cdot I_2+\ldots+I_1^2 I_2^{n-3}+I_1 I_2^{n-2}+I_2^{n-1})+I_1^n}$$

$$b_{2n} = \frac{V_0 a_0(I_1^{n-1}\cdot I_2+I_1^{n-2}I_2^2+\ldots+I_1^2 I_2^{n-2}+I_1 I_2^{n-1})+I_1^n I_2 - V_1 I_2^n a_0}{V_0 a_0(I_1^{n-1}+I_1^{n-2}\cdot I_2+\ldots+I_1 I_2^{n-2}+I_2^{n-1})+I_1^n} \quad (22)$$

$$= \frac{\{\alpha(q-p)(p^{n-1}q+p^{n-2}q^2+\ldots+p_2 q^{n-2}+pq^{n-1})+p^n q\}I_0^{n+1}-(\alpha p I_0+\beta)q^n I_0^n}{\alpha(q-p)I_0(p^{n-1}I_0^{n-1}+p^{n-2}q I_0^{n-1}+\ldots+pq^{n-2}I_0^{n-1}+q^{n-1}I_0^{n-1})+p^n I_0^n}$$

$$= \frac{\alpha I_0^{n+1}(pq^n-p^n q)+I_0^{n+1}p^n q-\alpha pq^n I_0^{n+1}-\beta q^n I_0^n}{\alpha I_0^n(q^n-p^n)+p^n I_0^n}$$

$$= \frac{I_0(\alpha pq^n-\alpha p^n q+p^n q-\alpha pq^n)-\beta q^n}{\alpha q^n+(1-\alpha)p^n}$$

$$= \frac{I_0(1-\alpha)p^n q-\beta q^n}{\alpha q^n+(1-\alpha)p^n}$$

The correction function of degree 2n therefore as below;

$$f_{2n}(Vx) = -\log(a_{2n}Vx+b_{2n}) \quad (23)$$

$$= -\log\left(\frac{q^n}{\alpha q^n+(1-\alpha)p^n}Vx+\frac{I_0(1-\alpha)p^n q-\beta q^n}{\alpha q^n+(1-\alpha)p^n}\right)$$

and if n is sufficiently large, as $p^n=0$, it will be;

$$\lim_{2n\to\infty} f_{2n}(Vx) = -\log\left(\frac{1}{\alpha}Vx-\frac{\beta}{\alpha}\right) \quad (24)$$

$$= -\log\left\{\frac{1}{\alpha}(\alpha Ix+\beta)-\frac{\beta}{\alpha}\right\}$$

$$= -\log ix$$

thereby enables correction in gain drift $\alpha$ and offset drift $\beta$ in input.

In the operational expressions shown in FIG. 8, the offset drift content $\beta'$ corresponding to the light amount $I_1$ is shifted to the right to become $f_1(Vx)$, and then the $f_2(Vx)$ corresponding to the light amount $I_2$ is obtained by shifting the gain drift upward by log $\Delta 2$. Since one calibration operation makes an error of log $\Delta$ for the light amount $I_1$, the shifting operation described above will be repeated in the opposite direction for several times to converge the value which is corrected for drifts.

According to this invention, the conversion table per se is prepared in n bit(s), and the operation of gain drift $\alpha$ and offset drift $\beta$ are conducted in (n+2) bits, and they are loaded in the conversion tables. This permits quick operation to obtain highly precise shift data. Therefore, supposing $$\left.\begin{array}{l} f_o = -\log(Vx) \\ Vx = \alpha Ix+\beta \\ I_1 = pI_o \\ I_2 = qI_o \end{array}\right\} \quad (25)$$

the offset correction ($Ix=I_1$) will be expressed as below if the error log $\Delta=-\log I_1-(-\log V_1)=\log (V_1/I_1)$ and $Vx=Ix+62'$;

$$V_1 = I_1 + \beta' \\ \log(V_1/I_1) = \log(I_1 + \beta')/I_1 \\ \beta' = V_1 - I_1 = \alpha I_1 + \beta - I_1 = (\alpha - 1)I_1 + \beta \\ f_1(Vx) = f_o(Vx - \beta') = -\log(Vx - V_1 + I_1)$$ (26)

$$= -\log(\alpha x + \beta - \alpha I_1 - \beta + I_1) = -\log(\alpha x + I_1 - \alpha I_1)$$

And the gain correction ($Ix=I_2$) will be expressed as below.

$$\text{the error } \log\Delta = -\log I_2 - f_1(V_2) \tag{27}$$

$$= -\log I_2 - \log(V_2 - V_1 + I_1)$$

$$= \log(V_2 - V_1 + I_1)/I_2$$

$$= \log(\alpha I_2 + \beta - \alpha I_1 - \beta + I_1)/I_2$$

$$= \log(\alpha I_2 - \alpha I_1 + I_1)/I_2$$

$$f_2(Vx) = f_1(Vx) + \log \Delta \tag{28}$$

$$= -\log(\alpha x + I_1 - \alpha I_1) + \log(\alpha I_2 - \alpha I_1 + I_1)/I_2$$

$$= -\log(\alpha x + I_1 - \alpha I_1)I_2/(\alpha I_2 - \alpha I_1 + I_1)$$

According to this invention calibration method for an input section of a color film inspection system, the input section can be calibrated precisely against the gain drift and offset drift by simply shifting conversion table data horizontally or vertically.

Figure 9:
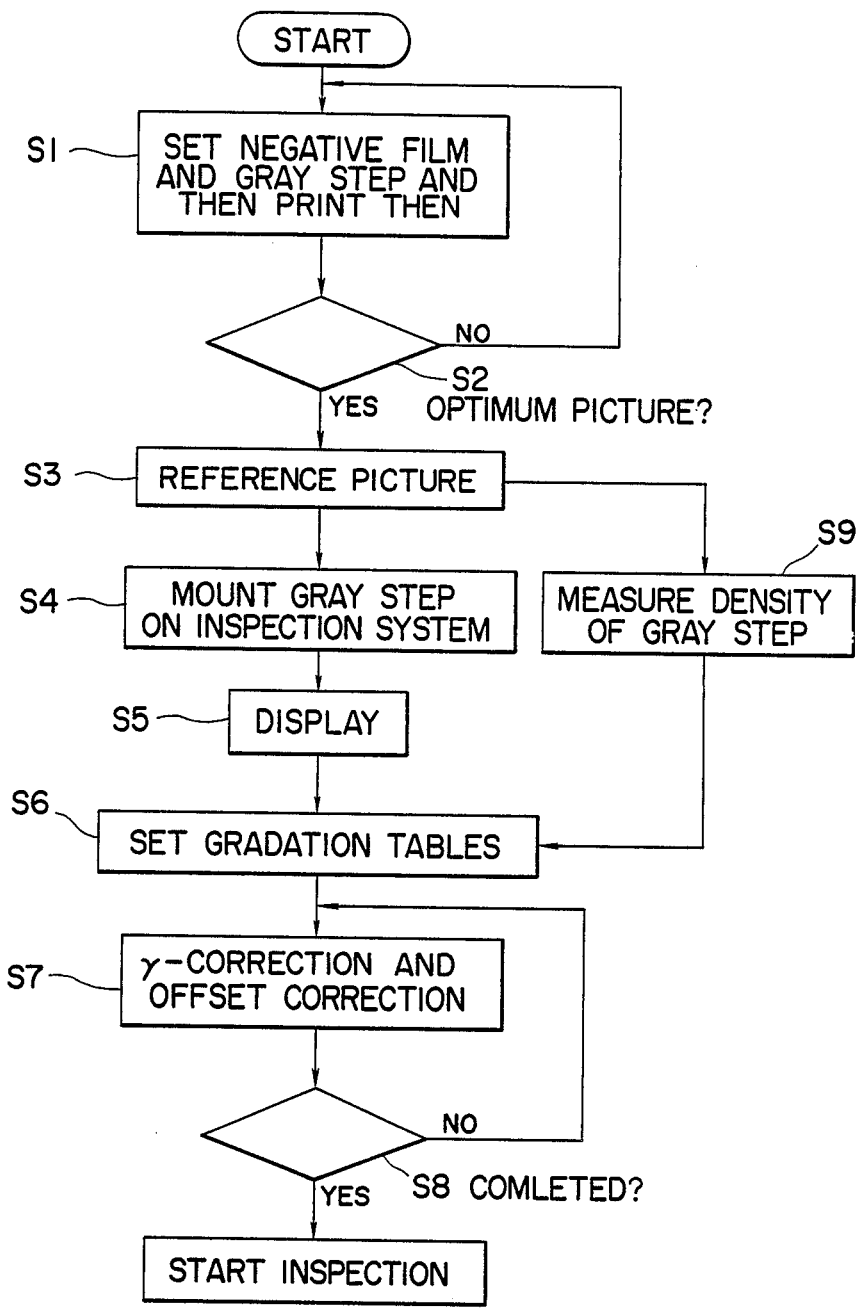
FIG. 9 is a flow chart to show the operation of this invention method.

The inspection method of this invention will now be described referring to a flow chart shown in FIG. 9.

Figure 13:
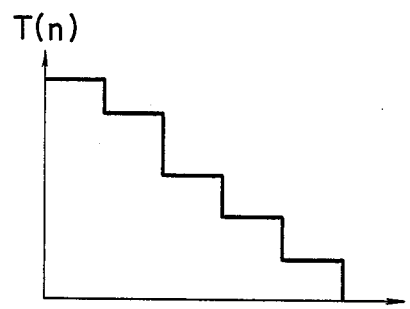
FIGS. 13, 14 and 15 are views to explain the gradation table according to this invention.
Figure 14:
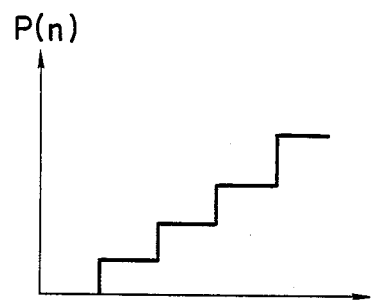
Figure 15:
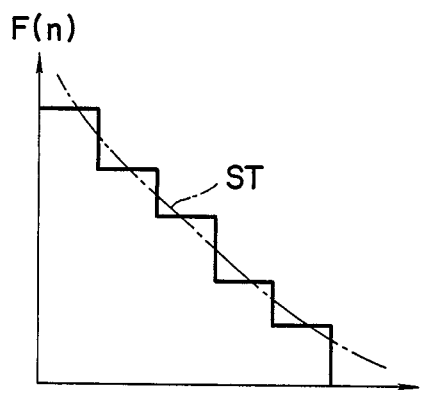

A negative film 1 which is a reference film with original images as shown in FIG. 10A is placed at predetermined printing position adjacent to a gray step 11 having gradation by predetermined density differences and the same mask density as the negative film 1, so that the negative film 1 and the gray step 11 are adjacent to each other when the film is printed as shown in FIG. 11 (Step S1). The predetermined gray step may be picked up on the negative film 1 per se as shown in FIG. 11. In this case, the negative film 1 is printed by a photographic color printer. As shown in FIG. 12, a reference picture 12 is obtained where the images and the gray step are printed side by side. The image in the reference picture 12 are judged whether or not the images are printed optimally, and if not, printing operation is repeated until the optimal picture is printed ultimately (Steps S2 and S3). After such reference picture 12 ia printed, the gray step 11 (or the negative film if the step is integral thereto) used for the above printing process is mounted on the color film inspection device as mentioned above (Step S4), and the gray step 11 is displayed at the color monitor 10 of the inspection device (Step S5). At the same time, the density of the gray step of the reference picture 12 is measured (Step S9) and the gradation table is prepared in a manner to make the gray step 11 mounted in the color film inspection device identical to the density of the gray step printed after the gradation conversion (Step S8). This makes the gray step 11 on the color monitor 10 look identical to the gray step on a print. In other words, if it is assumed that the step of the gray step 11 is represented by T(n) shown in FIG. 13 and the step of the print which is printed by using the above step as the reference picture 12 is represented by P(n) shown in FIG. 14, the gradation F(n) of the color film inspection device becomes P(n)/T(n) as shown in FIG. 15. The gradation table ST can be obtained by interpolating the above. This gradation table is set initially in the inspection device.

Figure 16:
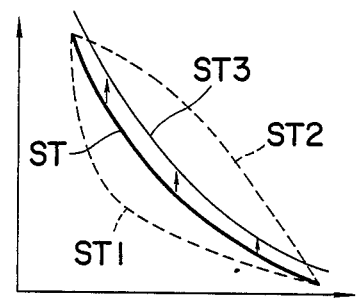
FIG. 16 is a graph to show the correction on the gradation table according to this invention.

Depending on the environment where an inspection system is installed (such as brightness in ambience, preference of an individual operator), the gray step on the color monitor 10 does not necessarily look identical to the gray step on a print. The displayed gray step therefore should be compared with the gray step 12A printed on the reference picture 12, and the gradation tables in the look-up tables 8 of the color film inspection system should be corrected for $\gamma$ or offset so as to make the displayed gray step becomes identical to the gray step 12A of the reference picture 12. For this, the table is adjusted by the keyboard 50 and the gradation tables are prepared anew with these corrected data to thereby complete the pre-processing of the film inspection (Steps S7 and S8). FIG. 16 shows the offset correction and $\gamma$ correction wherein the initially set gradation table is expressed as ST. If the image tone is wished to be harder, it should be corrected to ST1 while if it is wished to be softer, it should be corrected to ST2. The correction for offset is done by shifting the gradation table ST in the vertical direction.

When the pre-processing is completed in the film inspection system, film original images to be printed are inspected by the method described in conjunction with FIG. 2. Since the gradation conversion tables in the look-up tables 8 of the inspection system has already been adjusted to make the images displayed on the color monitor 10 identical in density to the picture which is printed by a printer, an optimal picture can be obtained if the displayed images are printed by the printer using the data which has been adjusted for optimal images.

As described in the foregoing, since the correspondence between the color film inspection system and printer is obtained and set in the system, this invention system enables to print the film original images which have been inspected by the color film inspection device by the printer as optimal images.

It should be understood that many modifications and adaptations of the invention will become apparent to those skilled in the art and it is intended to encompass such obvious modifications and changes in the scope of the claims appended hereto.

What is claimed is:

1. A calibration method for an input section of a color film inspection system comprising an image pick-up device which picks up original color images to be inspected, A/D converters which convert video signals from the image pick-up device into digital values, conversion tables which convert output digital values from the A/D converters into density signals with logarithmic tables, a color correction circuit which corrects in color output signals from the conversion tables, gradation converting means which convert in gradation three primary color signals from the color correction circuit independently and separately, and a color monitor which convents the outputs from the gradation converting means into analog values and displays the same, which is characterized in that offset correction is conducted by shifting said conversion tables in a horizontal direction on an input axis side, and gain correction is conducted by shifting said conversion tables in a vertical direction on an output axis side.

2. A calibration method for an input section of a color film inspection system as claimed in claim 1, wherein said offset correction is conducted by inserting a reference densitometer plate for offset correction.

3. A calibration method for an input section of a color film inspection system as claimed in claim 1, wherein said gain correction is conducted by inserting a reference densitometer plate for gain correction.

4. A calibration method for an input section of a color film inspection system as claimed in claim 1, wherein said conversion table is prepared in n bit(s), said offset and gain corrections are conducted in a bit larger than n, and data is loaded at said conversion tables in n bit(s).

5. A film inspection method which displays film original images to be printed on a display unit of a film inspection system, which comprises of the steps of:

preparing a gray step comprising gradation of predetermined density difference as well as having masking density which is identical to that of said film original images;

printing said gray step together a reference film original image so that printed image becomes to suitable;

obtaining a reference picture;

mounting said gray step in said film inspection system thereby to displaying on a display unit;

obtaining a gradation conversion table due to data of said displayed gray step and said gray step in the reference picture; and setting said gradation conversion table in said film inspection system as a gradation table.

6. A film inspection method as claimed in claim 5, wherein said gradation conversion data tables are corrected for $\gamma$ correction and offset correction and then made into said gradation conversion tables.

* * * * *